(No Model.)
O. GASSETT.
ELECTRIC RAILWAY.
No. 323,138. Patented July 28, 1885.
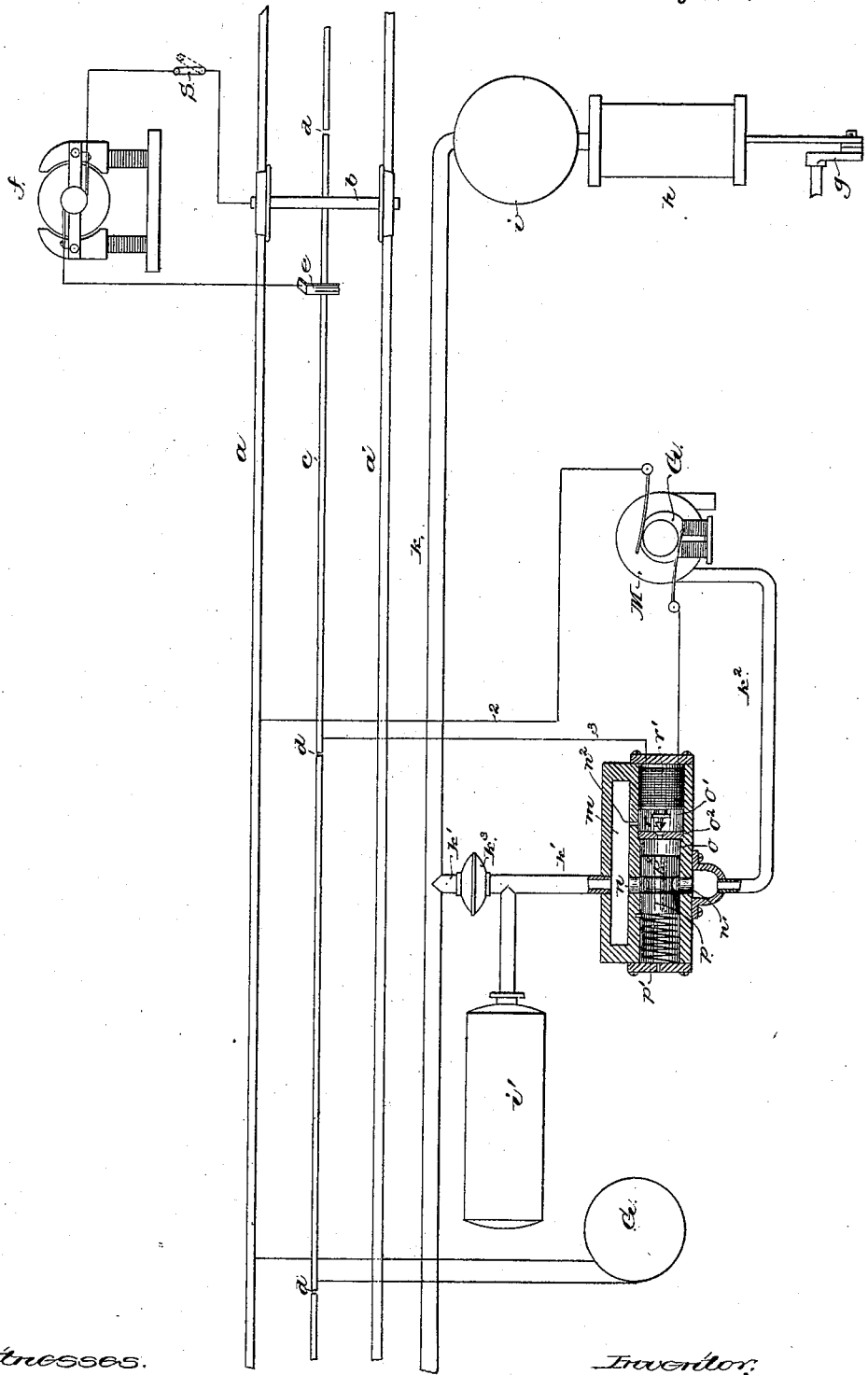
Witnesses.
John F. C. Brinkert
Henry Marsh
Inventor:
Oscar Gassett.
by Crowley & Gregory Attys.

UNITED STATES PATENT OFFICE.

OSCAR GASSETT, OF BOSTON, MASSACHUSETTS.

ELECTRIC RAILWAY.

SPECIFICATION forming part of Letters Patent No. 323,138, dated July 28, 1885.

Application filed May 26, 1884. (No model.)

*To all whom it may concern:*

Be it known that I, OSCAR GASSETT, of Boston, county of Suffolk, and State of Massachusetts, have invented an Improvement in Electric Railways, of which the following description, in connection with the accompanying drawings, is a specification, like letters on the drawings representing like parts.

My invention relates to an electric railway of that class in which an electric current is supplied by stationary conductors to the moving train, which is propelled by the actuating force of electromotors supplied with the said current. In apparatus of this class, where the stationary conductors extend for any great distance, there is a considerable loss of power from the resistance of the conductors to the electric current and the escape of said current from the conductors; and, furthermore, when two or more trains come upon such a section, the motors are connected in multiple-arc circuit and the current divided between them in such a manner as to render it almost or wholly ineffectual.

The present invention has for its object to overcome these objections and enable the track to be divided into such short sections as will be occupied by only one train at a time, although the prime motor or actuating-power may be located at one station, the said power being supplied to each section of a large number of the short sections of the track independently.

My invention also consists in appliances by which the current is automatically caused to be generated for each section of the conductors only while a train is on the said section, the generators of electricity being automatically stopped when the train passes off from each section.

The apparatus consists, essentially, of a prime motor, which may be employed to store power in any usual way, preferably by compressing air into a main tank or reservoir, which is provided with pipes for conveying the said compressed air along the line of railway to all the different sections, each of which sections is provided with a secondary motor adapted to be operated by the compressed air or other power stored by the prime motor and conveyed to the pipes. The said secondary motors operate electric generators, producing a current which flows through the stationary conductors and the electromotor on the train included in circuit therewith. The application of power to the said secondary motors is governed by an electro-magnet, the circuit of which is controlled by the train coming onto or leaving the section in such manner that when a train enters the section the full power is at once applied to the secondary motor, which thus generates the strong actuating-current in the circuit which is closed by and includes the electromotor on the train. When the power is distributed by a fluid-pressure, it is desirable to use auxiliary or secondary reservoirs or tanks in connection with the secondary motors, so that the said reservoirs may be gradually filled by the uniform operation of the prime motor, and will supply the sudden or intermittent demand of the corresponding motor while in operation, without drawing from the main pipes and reservoir to any considerable extent.

The drawing shows in diagram an electric railway and apparatus therefor embodying this invention, the device for controlling the application of the power to the electric generator being shown in section.

One or both of the rails $a\, a'$, forming the supporting-track for the train, one pair of wheels of which is indicated at $b$, may constitute one portion of the electric circuit, the other portion of which consists of a conductor, $c$, separated or divided by insulated spaces $d$ into a number of short sections about equal to the minimum space to be allowed between trains following one another on the railway. The train or motive portion thereof is provided with a contact-piece, $e$, for making a continuous electric connection with the conductor $c$, and an electromotor, $f$, of any suitable or usual construction, mechanically connected by suitable gearing with a pair of driving-wheels on the train, and connected in circuit between the contact piece or brush $e$ and pair of wheels $b$, so that the said motor completes the electrical connection between the rails $a$ $a'$ and the conductors $c$, which are also connected by wires 2 and 3, respectively, with the brushes or current-collectors of an electric generator, G, of any suitable or usual construction, having a suitable mechanical motor, M, for driving it.

It is to be understood that each section of the conductor $c$ between the insulating-points $d$ is connected with an independent generator, G, having a corresponding secondary motor.

The motors of all or of any desired number of the said generators are actuated by power derived from a prime motor of any suitable construction—such as a stationary steam-engine, the crank $g$ of which only is shown in this instance—operating an air-compressing device or pump, $h$, by which air or other actuating-fluid is compressed or accumulated under pressure in a main reservoir, $i$, connected with the main distributing-pipe $k$, leading to all the different sections of the track, each of which is provided with a branch pipe, $k'$, leading through controlling mechanism to the pipe $k^2$ and secondary motor M for the adjacent section of the electric conductor.

The controlling mechanism by which the flow of fluid from the pipe $k'$ to the pipe $k^2$ and secondary motor is controlled consists in this instance of a chest or air-chamber, $m$, having a main port, $n$, opening into a valve-cylinder, $o$, having an outlet-port, $n'$, and containing a valve, $p$, which controls the flow of the fluid from the port $n$ to the port $n'$, the said valve being shown in this instance as a piston having a deep annular groove, which, when in line with the said ports, as shown, forms a connection between them.

The valve-cylinder has a chamber, $o'$, separated by a partition, $o^2$, from the part containing the valve $p$, and a small port, $n^2$, connects the chest $m$ with the said chamber $o'$. The partition $o^2$ is provided with a small passage connecting the chamber $o'$ with the valve-cylinder $o$, and the said passage is controlled by a valve, $r$, operated by an electro-magnet, $r'$, shown in this instance as included in the circuit of the governor G.

The chamber $o'$ contains fluid at maximum pressure supplied through the port $n^2$, and when the passage through the partition $o^2$ is open the said fluid enters the cylinder $o$ and forces the valve $p$ to the position to open main port, $n$, as shown in the drawings. When, however, the passage in the partition $o^2$ is closed by the valve $r$, as when the magnet $r'$ is demagnetized, the valve $p$ is moved by a spring, $p'$, toward the partition $o^2$ until its ungrooved portion covers the port $n$, and thus cuts off the supply of air from the pipe $k^2$ and secondary motor.

The valve $p$ is provided with a small passage, $p^2$, or has a loose fit in the valve-cylinder, so that when the valve $r$ is closed the air between the partition $o^2$ and valve $p$ has an opportunity to escape, thus permitting the spring $p'$ to operate, although the passage $p^2$ is not large enough to relieve the pressure when the passage in the partition $o^2$ is open, as shown.

The valve $p$, as shown in this instance, is not intended to wholly cut off the supply of air to the pipe $k^2$, but will admit a small amount, sufficient to keep the secondary motor running, although with but slight power when the circuit of the generator is open between the conductor $c$ and the track, this being the condition when no train is on the section connecting the said conductor $c$ and the track. As soon, however, as a train comes upon the said section, it closes the circuit of the generator G, which will be running with sufficient power to energize the magnet $r'$, causing it to move the valve $r$, and thus cause the valve $p$ to open the port $n$, as before described, when the secondary motor will be run with full power, generating a current sufficient to actuate the electromotor $f$ and drive the train. As soon as the train passes from the section the circuit is again left open, and the magnet $r'$ consequently demagnetized, and the valve $p$ thus permitted to close the port $n$ and cut off almost the whole supply of power from the secondary motor.

As the secondary motors may often be inactive a much larger part of the time than they are active, it is desirable to provide at each of the said motors an auxiliary reservoir, $i'$, which may be gradually charged up to the same pressure as that in the main reservoir $i$ and pipe $k$; and, if desired, check-valves $k^3$ may be used in the pipes $k'$ to thus retain the pressure in the reservoir $i'$ in case that in the main reservoir should be reduced. The auxiliary reservoir $i$ will thus supply the secondary motor during its short period of operation without any considerable drain upon the main pipe, and the said auxiliary reservoir will be gradually filling during the time that the corresponding motor is inactive.

The portion of the circuit of the electromotor that is carried by the train is provided with a circuit-controlling device or switch, S, by which the circuit may be opened or closed while the train is on a section, and the power thus removed from or supplied to the secondary motor.

I claim—

1. In an electric railway, a stationary conductor divided into a series of sections, combined with independent electric generators for each of the said sections, and a prime motor affording motive power for several of the said generators, substantially as described.

2. In an electric railway, the rails for supporting the trains or vehicles, and the stationary conductors extending along the said rails divided into a series of sections, and an electromotor supported on the train or vehicle for propelling the same on the railway, the said motor being in circuit with each of the said sections of the conductor while the train or vehicle is passing the same, and independent electric generators for each of the said sections, and means controlled by the train or vehicle for governing the operation of the said generators, they being maintained in operation while the trains are moving along the corresponding sections, substantially as set forth.

3. In an electric railway, the rails for supporting the trains or vehicles, and the stationary conductors extending along the railway, and an electromotor supported on the train or vehicle for propelling the same, the said motor being in circuit with the said conductors, and an electric generator in circuit with the said conductors, and an actuating-motor for the said generator, and means controlled by the trains for governing the operation of the said motor, which is maintained in operation while the electromotor is in circuit, substantially as set forth.

4. A prime motor for supplying power to a series of secondary motors, electric generators operated by the said secondary motors, an electromotor movable into circuit with the said generators, and controlling devices for the secondary motors, whereby the power is applied when the electromotor is in circuit with the corresponding generator, substantially as described.

5. An electric generator in a normally-open circuit, and a continuously-operating motor therefor, combined with a device effecting the application of power to and its removal from the said motor, an electro-magnet included in the circuit of the generator co-operating with the said device, substantially as described, whereby the power is applied to the motor when the said circuit is closed, and the reverse.

6. A prime motor operating to accumulate fluid under pressure, a pipe for distributing said fluid, and a series of reservoirs connected with the said pipe, combined with a series of secondary motors, electric generators actuated thereby, and a series of independent electric circuits connected with the said generators, and an electromotor movable from one to another of the said circuits, and actuated by the current therein, substantially as described.

In testimony whereof I have signed my name to this specification in the presence of two subscribing witnesses.

OSCAR GASSETT.

Witnesses:
   JOS. P. LIVERMORE,
   W. H. SIGSTON.